United States Patent
Wen et al.

(10) Patent No.: US 11,847,083 B2
(45) Date of Patent: Dec. 19, 2023

(54) DAISY-CHAIN SPI INTEGRATED CIRCUIT AND OPERATION METHOD THEREOF

(71) Applicant: HIMAX TECHNOLOGIES LIMITED, Tainan (TW)

(72) Inventors: Shan-Chieh Wen, Tainan (TW); Ming-Huai Weng, Tainan (TW); Guei-Lan Lin, Tainan (TW); Che-Hao Chiang, Tainan (TW); Chi-Cheng Lin, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 78 days.

(21) Appl. No.: 17/553,689

(22) Filed: Dec. 16, 2021

(65) Prior Publication Data

US 2023/0195672 A1  Jun. 22, 2023

(51) Int. Cl.
*G06F 13/40* (2006.01)
*G06F 1/10* (2006.01)
*G06F 13/42* (2006.01)

(52) U.S. Cl.
CPC ............ *G06F 13/4027* (2013.01); *G06F 1/10* (2013.01); *G06F 13/4291* (2013.01)

(58) Field of Classification Search
CPC ..... G06F 13/4027; G06F 1/10; G06F 13/4291
See application file for complete search history.

(56) References Cited

U.S. PATENT DOCUMENTS

| 8,943,250 | B2 * | 1/2015 | Alley | G06F 13/4247 710/110 |
| 2011/0153888 | A1 * | 6/2011 | Sun | G06F 13/4256 710/313 |
| 2013/0297829 | A1 * | 11/2013 | Berenbaum | G06F 13/4256 710/36 |
| 2020/0286571 | A1 | 9/2020 | McCracken et al. | |
| 2021/0064563 | A1 | 3/2021 | Quiquempoix | |

(Continued)

FOREIGN PATENT DOCUMENTS

TW  202001504  1/2020

OTHER PUBLICATIONS

Wikipedia, "Serial Peripheral Interface", retrieved on Nov. 16, 2022, Available at: https://en.wikipedia.org/wiki/Serial_Peripheral_Interface.

(Continued)

*Primary Examiner* — Nimesh G Patel
(74) *Attorney, Agent, or Firm* — JCIPRNET

(57) ABSTRACT

The disclosure provides a daisy-chain serial peripheral interface (SPI) integrated circuit (IC) and an operation method thereof. The daisy-chain SPI IC includes a first MISO interface circuit, a second MISO interface circuit, a first data enable (DE) interface circuit, and a second DE interface circuit. When the daisy-chain SPI IC is a target slave circuit selected by a master IC for reading target data, the first DE interface circuit outputs a DE signal to the master IC, and the first MISO interface circuit sends back the target data to the master IC based on the timing of the DE signal. When the daisy-chain SPI IC is not the target slave circuit, the signal received by the second DE interface circuit is transmitted to the first DE interface circuit, and the data received by the second MISO interface circuit is transmitted to the first MISO interface circuit.

24 Claims, 5 Drawing Sheets

(56) References Cited

U.S. PATENT DOCUMENTS

2021/0064564 A1* 3/2021 Quiquempoix ..... G06F 13/4282
2021/0216492 A1* 7/2021 Lane ................... G06F 13/4256

OTHER PUBLICATIONS

"Search Report of Europe Counterpart Application", dated Dec. 14, 2022, p. 1-p. 9.
"Notice of allowance of Taiwan Counterpart Application", dated Sep. 19, 2023, p. 1-p. 4.

* cited by examiner

DAISY-CHAIN SPI INTEGRATED CIRCUIT AND OPERATION METHOD THEREOF

BACKGROUND

Technology Field

The disclosure relates to an integrated circuit (IC), and particularly to, a daisy-chain serial peripheral interface (SPI) IC and the method thereof.

Description of Related Art

Some product applications may require multiple integrated circuits (ICs) to work together. For example, in a large touch display IC (LTDI) application, multiple (e.g., 30) driving integrated circuits work together to drive the same large touch display panel. The Serial Peripheral Interface (SPI) architecture can provide a multi-drop driving architecture. In the multi-drop drive architecture, a master integrated circuit (IC) can connect/drive multiple slave integrated circuits (ICs) through the same wire (channel). As the fan-out of the wire becomes larger, the signal transition time of the wire becomes longer, resulting in poorer signal transmission efficiency. In addition, the master IC can only select one slave IC at a time in the existing SPI protocol. The existing SPI protocol does not have a broadcast function. How the master IC efficiently controls many slave ICs is one of many technical issues in this technical field.

SUMMARY

The disclosure provides a daisy-chain serial peripheral interface (SPI) integrated circuit and an operation method thereof, which enable a master integrated circuit (IC) in the daisy-chain SPI architecture to efficiently control multiple slave integrated circuits (ICs).

In an embodiment of the disclosure, the daisy-chain SPI IC includes a first master input/slave output (MISO) interface circuit, a second MISO interface circuit, a first data enable (DE) interface circuit, a second DE interface circuit, a routing circuit, and a core circuit. The routing circuit is coupled to an input terminal of the first MISO interface circuit, an output terminal of the second MISO interface circuit, an input terminal of the first DE interface circuit, and an output terminal of the second DE interface circuit. The core circuit is coupled to the routing circuit. When the daisy-chain SPI IC is a slave IC of a daisy-chain SPI architecture, and the daisy-chain SPI IC is a target slave circuit selected by a master IC of the daisy-chain SPI architecture for reading target data, the core circuit outputs a DE signal to the master IC through the routing circuit and the first DE interface circuit, and the core circuit sends back the target data to the master IC through the routing circuit and the first MISO interface circuit based on a timing of the DE signal. When the daisy-chain SPI IC is the slave IC of the daisy-chain SPI architecture, and the daisy-chain SPI IC is not the target slave circuit, the routing circuit transmits a signal received by the second DE interface circuit to the first DE interface circuit, and the routing circuit transmits data received by the second MISO interface circuit to the first MISO interface circuit.

In an embodiment of the disclosure, the operation method includes steps as follows. An exclusive identification code of the daisy-chain SPI IC is defined by at least one chip identification pin of the daisy-chain SPI IC. When the exclusive identification code indicates that the daisy-chain SPI IC is a slave IC of a daisy-chain SPI architecture, a core circuit of the daisy-chain SPI IC determines whether the daisy-chain SPI IC is a target slave circuit selected by a master IC of the daisy-chain SPI architecture. When the daisy-chain SPI IC is the slave IC of the daisy-chain SPI architecture and the daisy-chain SPI IC is the target slave circuit selected by the master IC for reading target data, the core circuit outputs a DE signal to the master IC through a routing circuit of the daisy-chain SPI IC and a first DE interface circuit of the daisy-chain SPI IC, and the core circuit sends back the target data to the master IC through the routing circuit and a first MISO interface circuit of the daisy-chain SPI IC based on a timing of the DE signal. When the daisy-chain SPI IC is the slave IC of the daisy-chain SPI architecture and the daisy-chain SPI IC is not the target slave circuit, the routing circuit transmits a signal received by a second DE interface circuit of the daisy-chain SPI IC to the first DE interface circuit, and the routing circuit transmits data received by a second MISO interface circuit of the daisy-chain SPI IC to the first MISO interface circuit.

In summary, the daisy-chain SPI IC in the embodiments of the disclosure is adapted for the daisy-chain SPI architecture. In the daisy-chain SPI architecture, that is, in the multi-chip cascaded architecture, multiple slave ICs are connected in series to form a daisy-chain, and the master IC is connected to the first slave IC in the daisy-chain. The daisy-chain SPI IC may improve the multi-drop driving issue in a multi-chip system through the daisy-chain architecture. By adding a DE signal by customizing the SPI protocol, the master IC may acquire the timing of the data sent back by any one of the slave ICs. Therefore, in the daisy-chain SPI architecture, the master IC can efficiently control multiple slave ICs.

In order to make the features and advantages of the disclosure comprehensible, embodiments accompanied with drawings are described in detail below.

DESCRIPTION OF THE EMBODIMENTS

Figure 1:
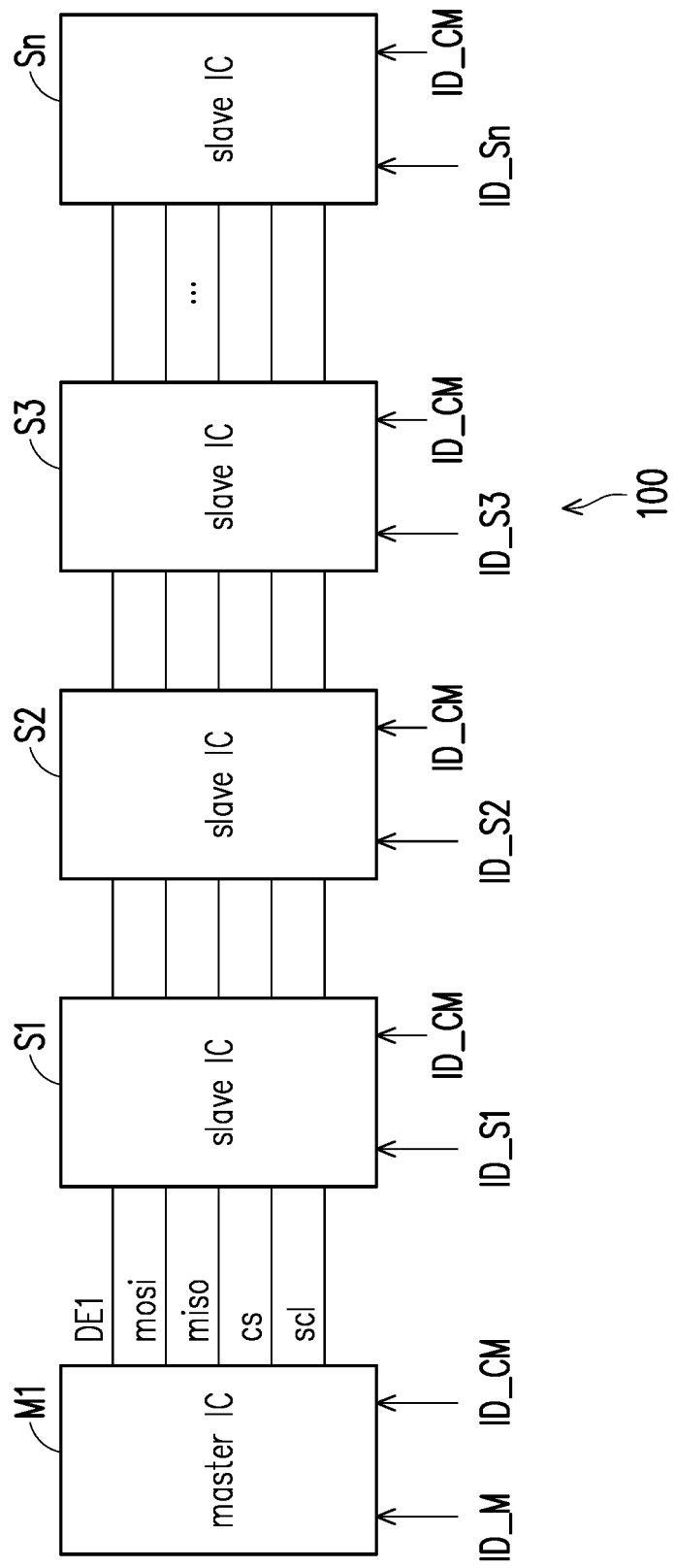
FIG. 1 is a schematic view of a circuit block of a daisy-chain serial peripheral interface (SPI) architecture according to an embodiment of the disclosure.

The terms "couple/connect" used in this specification (including claims) may refer to any direct or indirect connection means. For example, "a first device is coupled (or connected) to a second device" should be interpreted as "the first device is directly connected to the second device" or "the first device is indirectly connected to the second device through other devices or connection means." The terms "first", "second", and similar terms mentioned in the specification or the claims are merely used to name the discrete elements or to differentiate among different embodiments or ranges. Therefore, the terms should not be regarded as limiting the upper or lower bound of the number of the elements and should not be used to limit the manufacturing sequence or arrangement sequence of elements. Moreover, wherever appropriate in the drawings and embodiments, elements/components/steps with the same reference numerals represent the same or similar parts. Elements/components/steps with the same reference numerals or names in different embodiments may be cross-referenced.

The existing standard Serial Peripheral Interface (SPI) protocol cannot meet the application of serial connection of multiple integrated circuits. The existing SPI protocol restricts that after a SPI master integrated circuits (IC) sends a read command, the master IC must receive the data returned by a SPI slave IC within a fixed number of clock cycles (i.e., within a fixed waiting time). In a structure where multiple integrated circuits are connected in series, once the number of integrated circuits is large, the slave IC that is farther from the master IC may not have time to send back data to the master IC within the waiting time specified in the standard SPI protocol, causing a violation of the standard SPI protocol. The following embodiments of the present invention will illustrate the solution. The custom SPI protocol proposed in the following embodiment adds a data enable (DE) signal. Based on the data enable signal, the master IC can know the timing of the data returned by any one of the slave ICs in a daisy-chain SPI architecture. After issuing a read command, the master IC does not need to be idle to wait for the return data to arrive (at this time, the master IC can do other things), until the data enable signal prompts the return data (valid data) to arrive.

FIG. 1 is a schematic view of a circuit block of a daisy-chain SPI architecture 100 according to an embodiment of the disclosure. The daisy-chain SPI architecture 100 includes multiple IC connected in series, such as master ICs M1 and slave ICs S1, S2, S3, . . . , and Sn. The number n of the slave ICs S1-Sn may be determined according to the actual design. In the daisy-chain SPI architecture 100, the slave ICs S1-Sn are connected in series to form a daisy-chain, and the master IC M1 is connected to the first slave IC S1 in the daisy-chain. The master IC M1 and the slave ICs S1-Sn respectively are given/defined different exclusive identification codes. For example, the exclusive identification code of the master IC M1 is ID_M, the exclusive identification code of the slave IC S1 is ID_S1, the exclusive identification code of the slave IC S2 is ID_S2, the exclusive identification code of the slave IC S3 is ID_S3, and the exclusive identification code of the slave IC Sn is ID_Sn.

The master IC M1 may send a command (or data) mosi, a chip selection signal cs, and a clock signal scl that comply with the SPI specification to the daisy-chain, any slave IC in the daisy-chain may transmit the command (or data) mosi, and the chip selection signal cs and the clock signal scl from the previous integrated circuit to the subsequent integrated circuit. Each of the slave ICs S1-Sn may decode the chip selection signal cs to determine whether it is the target slave circuit selected by the master IC M1. For example, when the decoding result of the slave IC S3 decoding the chip selection signal cs matches the exclusive identification code ID_S3, the slave IC S3 may determine that it is the target slave circuit selected by the master IC M1, so the slave IC S3 may execute (process) the command (or data) mosi of the master IC M1.

In addition, the master IC M1 and the slave ICs S1-Sn are also given/defined one (or more) identical broadcast identification code ID_CM. Each of the slave ICs S1-Sn may determine whether it is a broadcast target of the master IC M1 according to the relationship between the chip selection signal cs and the broadcast identification code ID_CM. For example, when the decoding result of the chip selection signal cs does not match the exclusive identification code ID_S3 of the slave IC S3 but matches the broadcast identification code ID_CM shared by the slave ICs S1-Sn, the slave IC S3 may determine itself as the target slave circuit (broadcast target) selected by the master IC M1, so the slave IC S3 may execute (process) the command (or data) mosi of the master IC M1. Conversely, when the decoding result of the chip selection signal cs matches neither the exclusive identification code ID_S3 nor the broadcast identification code ID_CM, the slave IC S3 may determine that it is not the target slave circuit selected by the master IC M1, so the slave IC S3 may ignore (does not process) the command (or data) mosi of the master IC M1.

Any slave IC in the daisy-chain may transmit the data miso and a data enable (DE) signal DE1 from the subsequent integrated circuit to the previous integrated circuit. Therefore, based on the execution (processing) result of the command (or data) mosi, each of the slave ICs S1-Sn may send back the data miso and the DE signal DE1 to the master IC M1. The DE signal DE1 may indicate the effective timing of the data miso. Based on the daisy-chain architecture, the time it takes for the master IC M1 to access the slave ICs in different locations (the interval from sending a command to receiving the sent back data) varies. Based on the DE signal DE1, there is no need to idle after the master IC M1 sends a command to wait for the sent back data to arrive. After the command is sent, the master IC M1 can do other things until the DE signal DE1 prompts the arrival of the sent-back data (valid data).

In summary, in the daisy-chain SPI architecture 100, that is, in the multi-chip cascaded architecture, the slave ICs S1-Sn are connected in series to form a daisy-chain, and the master IC M1 is connected to the first slave IC S1 in the daisy-chain. The daisy-chain SPI architecture 100 can improve the multi-drop driving issue in a multi-chip system. By adding the DE signal DE1 by customizing the SPI protocol, the master IC M1 may acquire the timing of the data sent back by any one of the slave ICs S1-Sn. Therefore, in the daisy-chain SPI architecture 100, the master IC M1 can efficiently control the slave ICs S1-Sn.

Figure 2A:
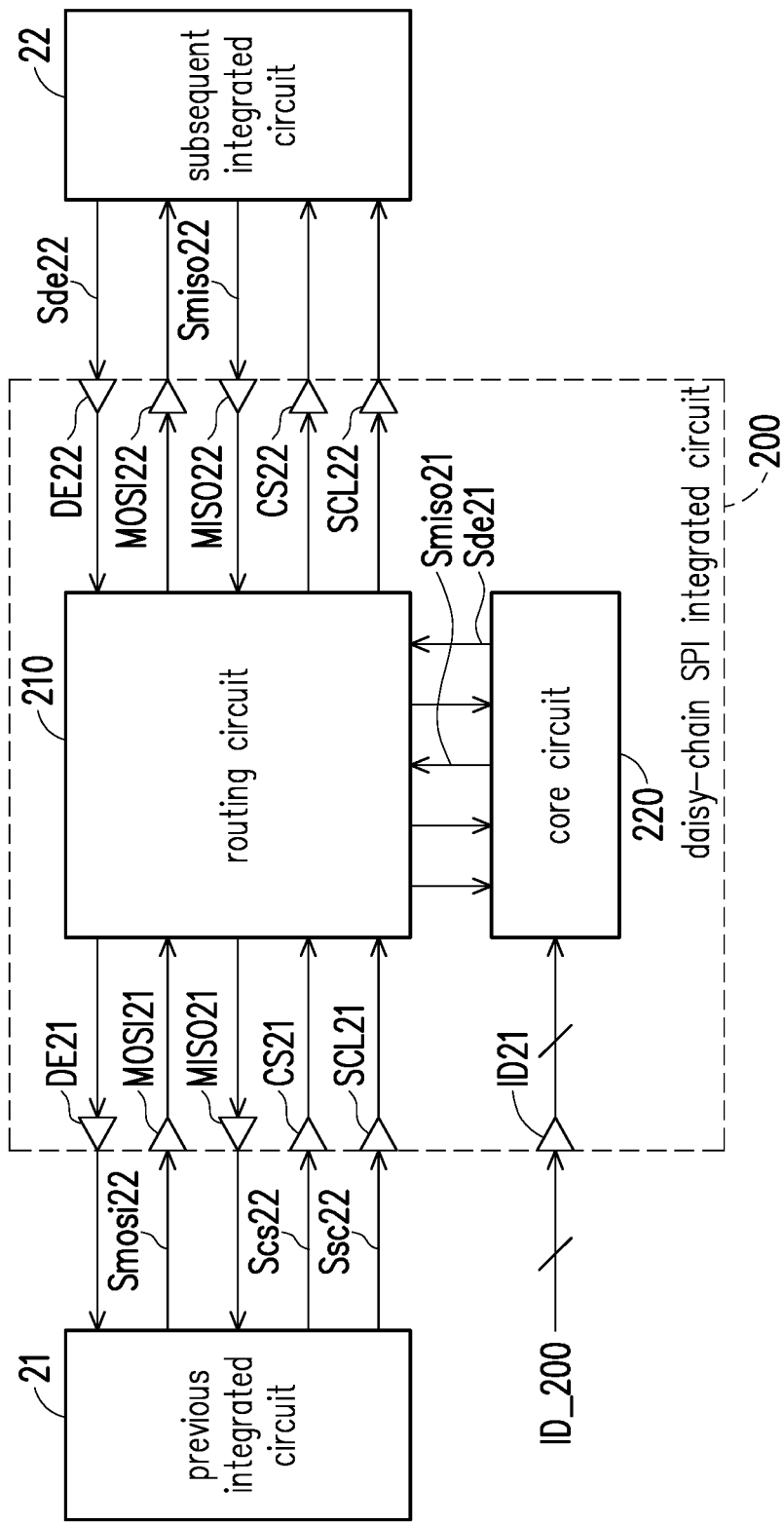
FIG. 2A and FIG. 2B are schematic view of a circuit block of a daisy-chain SPI integrated circuit according to an embodiment of the disclosure.
Figure 2B:
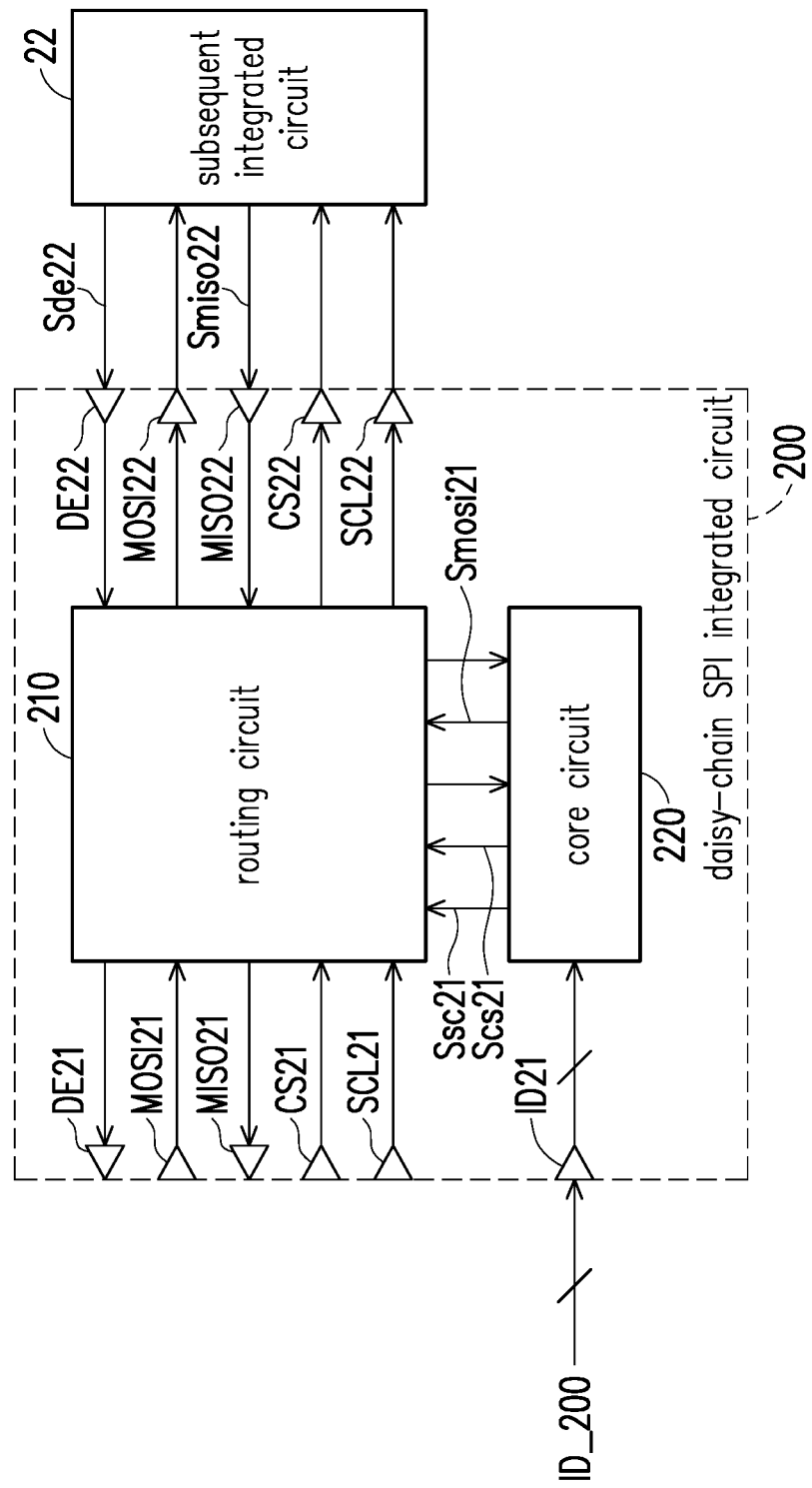

FIG. 2A and FIG. 2B are schematic view of a circuit block of a daisy-chain SPI IC 200 according to an embodiment of the disclosure. FIG. 2A illustrates an application scenario of the daisy-chain SPI IC 200. The daisy-chain SPI IC 200 shown in FIG. 2A may be analogically reasoned by referring to the relevant description of any one of the slave ICs S1-Sn shown in FIG. 1. FIG. 2B illustrates another application scenario of the daisy-chain SPI IC 200. The daisy-chain SPI IC 200 shown in FIG. 2B can be analogically reasoned by referring to the relevant description of the master IC M1 shown in FIG. 1.

The daisy-chain SPI IC 200 shown in FIG. 2A can be used as one of many embodiments of any one of the slave ICs S1-Sn shown in FIG. 1. The daisy-chain SPI IC 200 is coupled between a previous integrated circuit 21 and a subsequent integrated circuit 22. Assuming that the daisy-chain SPI IC 200 shown in FIG. 2A is the slave IC Si shown in FIG. 1, then the previous integrated circuit 21 and the subsequent integrated circuit 22 shown in FIG. 2A can be the master IC M1 and the slave IC S2 shown in FIG. 1, and the exclusive identification code ID_200 shown in FIG. 2A may be the exclusive identification code ID_S1 shown in FIG. 1. Assuming that the daisy-chain SPI IC 200 shown in FIG. 2A is the slave IC S2 shown in FIG. 1, then the previous integrated circuit 21 and the subsequent integrated circuit 22 shown in FIG. 2A can be the slave IC Si and the slave integrated circuit S3 shown in FIG. 1, and the exclusive identification code ID_200 shown in FIG. 2A may be the exclusive identification code ID_S2 shown in FIG. 1.

The daisy-chain SPI IC 200 shown in FIG. 2B can be used as one of many embodiments of the master IC M1 shown in FIG. 1. The daisy-chain SPI IC 200 is coupled to the subsequent integrated circuit 22. Assuming that the daisy-chain SPI IC 200 shown in FIG. 2B is the master IC M1 shown in FIG. 1, the subsequent integrated circuit 22 shown in FIG. 2B may be the slave IC S1 shown in FIG. 1. The exclusive identification code ID_200 shown in FIG. 2B may be the exclusive identification code ID_M shown in FIG. 1.

As shown in FIG. 2A and FIG. 2B, the daisy-chain SPI IC 200 includes a DE interface circuit DE21, a DE interface circuit DE22, a master output/slave input (MOSI) interface circuit MOSI21, an MOSI interface circuit MOSI22, a master input/slave output (MISO) interface circuit MISO21, an MISO interface circuit MISO22, a chip selection interface circuit CS21, a chip selection interface circuit CS22, a clock interface circuit SCL21, a clock interface circuit SCL22, a routing circuit 210, and a core circuit 220. Each of the interface circuits may include pins (or solder pads, or connection pads). Based on actual design, in some embodiments, each of the interface circuits may include a buffer circuit, a gain circuit, an electrostatic discharge (ESD) protection circuit, and/or other circuits. The routing circuit 210 is coupled to the input terminal of the MISO interface circuit MISO21, the output terminal of the MISO interface circuit MISO22, the input terminal of the DE interface circuit DE21, and the output terminal of the DE interface circuit DE22. The core circuit 220 is coupled to the routing circuit 210.

Figure 3:
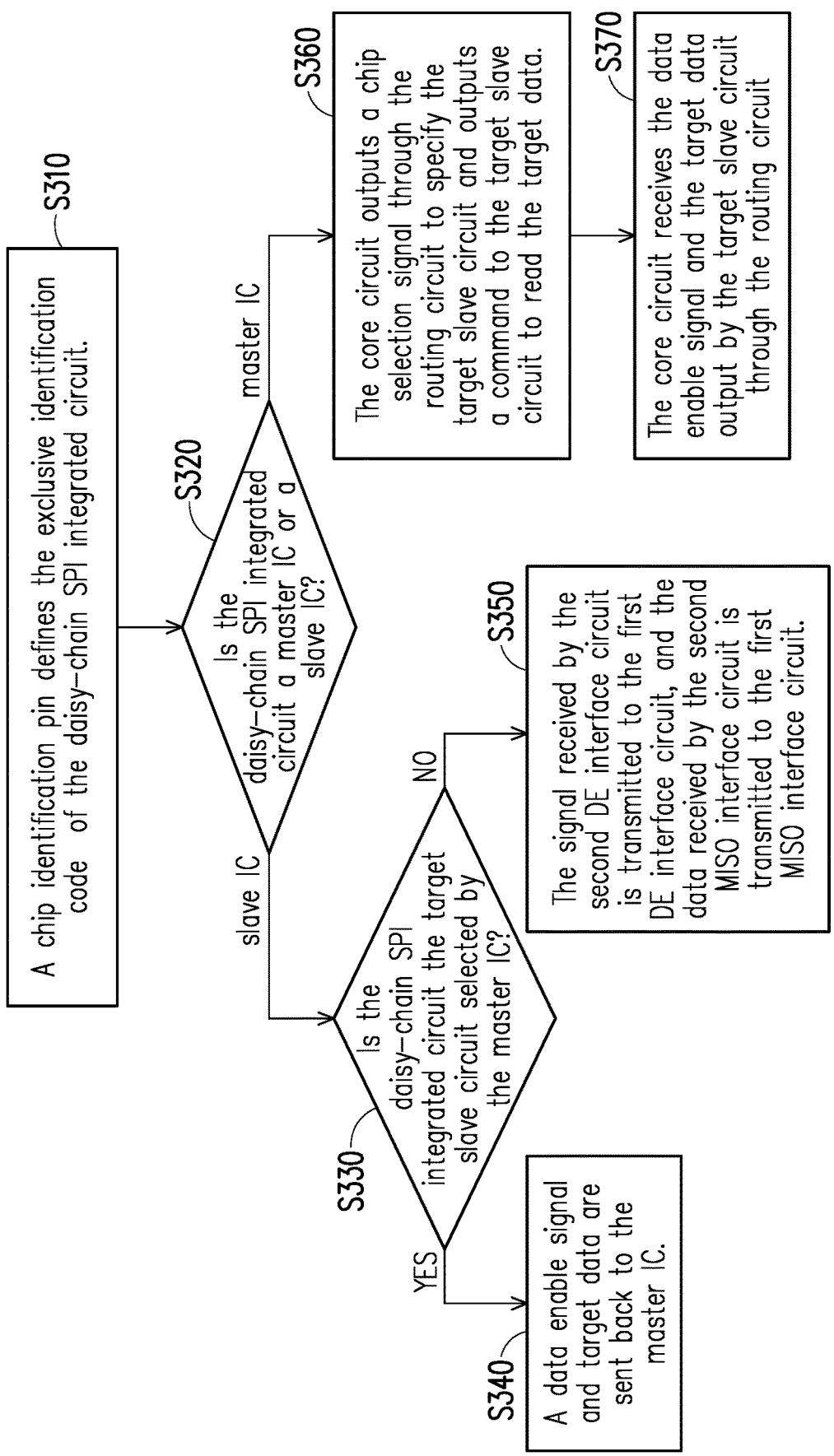
FIG. 3 is a flowchart illustrating an operating method of a daisy-chain SPI integrated circuit according to an embodiment of the disclosure.

FIG. 3 is a flowchart illustrating an operating method of a daisy-chain SPI integrated circuit according to an embodiment of the disclosure. Referring to FIG. 2A (or FIG. 2B) and FIG. 3, in step S310, at least one chip identification pin ID21 may define the exclusive identification code ID_200 of the daisy-chain SPI IC 200. In step S320, it can be determined whether the daisy-chain SPI IC 200 is a master IC or a slave IC. In some practical design examples, the core circuit 220 may check the exclusive identification code ID_200 of the chip identification pin ID21 to determine whether the daisy-chain SPI IC 200 is a master IC or a slave IC. For example, the identification code "0000 0000" can be defined as "the exclusive identification code of the master IC", the identification code "1111 1111" can be defined as the "broadcast identification code" (an identification code shared by multiple slave ICs), and other identification codes "0000 0001" to "1111 1110" can be defined as "exclusive identification codes for different integrated circuits". Therefore, the core circuit 220 can check whether the exclusive identification code ID_200 of the chip identification pin ID21 is the identification code "0000 0000" or other identification codes "0000 0001" to "1111 1110", and it can be determined whether the role of the daisy-chain SPI IC 200 is the master IC or the slave IC in the daisy-chain SPI architecture 100.

When the exclusive identification code ID_200 indicates that the daisy-chain SPI IC 200 is a slave IC in the daisy-chain SPI architecture 100 (the determining result of step S320 is "slave integrated circuit"), the core circuit 220 of the daisy-chain SPI IC 200 may perform step S330 to determine whether the daisy-chain SPI IC 200 is the target slave circuit selected by the master IC M1 in the daisy-chain SPI architecture 100. For step S330, step S340, and step S350 shown in FIG. 3, refer to the application scenario shown in FIG. 2A.

Referring to FIG. 2A and FIG. 3, when the daisy-chain SPI IC 200 is a target slave circuit (in step S330, the determining result is "Yes") selected by the master IC M1 in the daisy-chain SPI architecture 100 to read target data, the core circuit 220 may proceed to step S340. Through the routing circuit 210 and the DE interface circuit DE21, the DE signal Sde21 is used as the DE signal DE1 shown in FIG. 1 and output to the master IC Ml. Based on the timing of the DE signal Sde21, the core circuit 220 can send back target data Smiso21 to the master IC M1 through the routing circuit 210 and the MISO interface circuit MISO21 (step S340). When the daisy-chain SPI IC 200 is not the target slave circuit (in step S330, the determining result is "No"), the core circuit 220 can proceed to step S350 to control the routing circuit 210 to transmit a signal Sde22 received by the DE interface circuit DE22 (second DE interface circuit) to the DE interface circuit DE21 (first DE interface circuit). In step S350, the routing circuit 210 may also transmit the data Smiso22 received by the MISO interface circuit MISO22 (a second MISO interface circuit) to the MISO interface circuit MISO21 (a first MISO interface circuit).

Referring to FIG. 2A, the routing circuit 210 is also coupled to the output terminal of the clock interface circuit SCL21 and the input terminal of the clock interface circuit SCL22. When the daisy-chain SPI IC 200 is one of the slave ICs S1-Sn in the daisy-chain SPI architecture 100, the routing circuit 210 can transmit a clock signal Ssc22 received by the clock interface circuit SCL21 to the clock interface circuit SCL22 and the core circuit 220. The routing circuit 210 is also coupled to the output terminal of the chip selection interface circuit CS21 and the input terminal of the chip selection interface circuit CS22. When the daisy-chain SPI IC 200 is one of the slave ICs S1-Sn in the daisy-chain SPI architecture 100, the routing circuit 210 can transmit the chip selection signal Scs22 received by the chip selection interface circuit CS21 to the chip selection interface circuit CS22 and the core circuit 220. The routing circuit 210 is also coupled to the output terminal of the MOSI interface circuit MOSI21 and the input terminal of the MOSI interface circuit MOSI22. When the daisy-chain SPI IC 200 is one of the slave ICs S1-Sn in the daisy-chain SPI architecture 100, the routing circuit 210 can transmit master circuit data Smosi22 received by the MOSI interface circuit MOSI21 to the MOSI interface circuit MOSI22 and the core circuit 220.

The master IC M1 in the daisy-chain SPI architecture 100 may send the chip selection signal cs (chip selection signal Scs22) to designate the daisy-chain SPI IC 200 as the target slave circuit, and send the command mosi (the master circuit data Smosi22) to the target slave circuit to read the target data. The core circuit 220 may decode the chip selection signal Scs22 to determine whether the daisy-chain SPI IC 200 is the target slave circuit selected by the master IC M1. When the decoding result of the core circuit 220 decoding the chip selection signal Scs22 matches the exclusive identification code ID_200 of the daisy-chain SPI IC 200, the core circuit 220 may determine that the daisy-chain SPI IC 200 is the target slave selected by the master IC M1. When the decoding result does not match the exclusive identification code ID_200 of the daisy-chain SPI IC 200 but matches the broadcast identification code ID_CM shared by the slave ICs S1-Sn, the core circuit 220 may determine the daisy-chain SPI IC 200 is the target slave circuit selected by the master IC M1.

When the core circuit 220 may determine the daisy-chain SPI IC 200 is the target slave circuit selected by the master IC Ml, the core circuit 220 may execute (process) the master circuit data Smosi22 (e.g., command or data) sent by the master IC M1. Assuming that the master circuit data Smosi22 includes data read commands. Based on the data read command sent by the master IC M1, the core circuit 220 may send back the target data Smiso21 and the DE signal Sde21 to the master IC M1 through the routing circuit 210, the MISO interface circuit MISO21, and the DE interface circuit DE21. The DE signal Sde21 may indicate the effective timing of the target data Smiso21.

When the decoding result matches neither the exclusive identification code ID_200 of the daisy-chain SPI IC 200 nor the broadcast identification code ID_CM, the core circuit 220 may determine that the daisy-chain SPI IC 200 is not the target slave circuit selected by the master IC M1. Therefore, the core circuit 220 may ignore (does not process) the master circuit data Smosi22 (e.g., command or data) sent by the master IC M1. In this case, the routing circuit 210 may transmit the data Smiso22 received by the MISO interface circuit MISO22 to the MISO interface circuit MISO21 based on the control of the core circuit 220, and the signal Sde22 received by the DE interface circuit DE22 is transmitted to the DE interface circuit DE21.

Referring to FIG. 2B and FIG. 3, when the exclusive identification code ID_200 indicates that the daisy-chain SPI IC 200 is the master IC M1 in the daisy-chain SPI architecture 100 (in step S320, the determining result is "master IC"), the core circuit 220 of the daisy-chain SPI IC 200 may perform step S360 and step S370. For step S360 and step S370 shown in FIG. 3, refer to the application scenario shown in FIG. 2B. In the scenario shown in FIG. 2B, that is, when the daisy-chain SPI IC 200 is the master IC M1 in the daisy-chain SPI architecture 100, through the routing circuit 210 and the clock interface circuit SCL22, the core circuit 220 may output the clock signal Ssc21 to the slave ICs S1-Sn in the daisy-chain SPI architecture 100.

In step S360, the core circuit 220 may output a chip selection signal Scs21 (the chip selection signal cs) to the slave ICs S1-Sn in the daisy-chain SPI architecture 100 through the routing circuit 210 and the chip selection interface circuit CS22 to specify/select the target slave circuit. In addition, through the routing circuit 210 and the MOSI interface circuit MOSI22, the core circuit 220 can output master circuit data Smosi21 (command mosi) to the target slave circuit to read the target data. In response to the command (the master circuit data Smosi21) of the core circuit 220, the target slave circuit may send back the signal Sde22 (DE signal) and the data Smiso22 (the target data) to the daisy-chain SPI IC 200.

In step S370, the core circuit 220 may receive the signal Sde22 (DE signal) and the data Smiso22 (the target data) output by the target slave circuit through the routing circuit 210, the DE interface circuit DE22, and the MISO interface circuit MISO22. The target slave circuit corresponds to the chip selection signal Scs21. By adding the signal Sde22 (DE signal) by customizing the SPI protocol, the core circuit 220 may acquire the timing of the data sent back by any one of the slave ICs S1-Sn. Based on the signal Sde22 (DE signal), there is no need to idle to wait for the data Smiso22 (the target data) after the core circuit 220 sends a command. After the command is sent, the core circuit 220 can do other things until the signal Sde22 (DE signal) prompts the arrival of the valid data Smiso22 (the target data). Therefore, the core circuit 220 can efficiently control the slave ICs S1-Sn.

Figure 4:
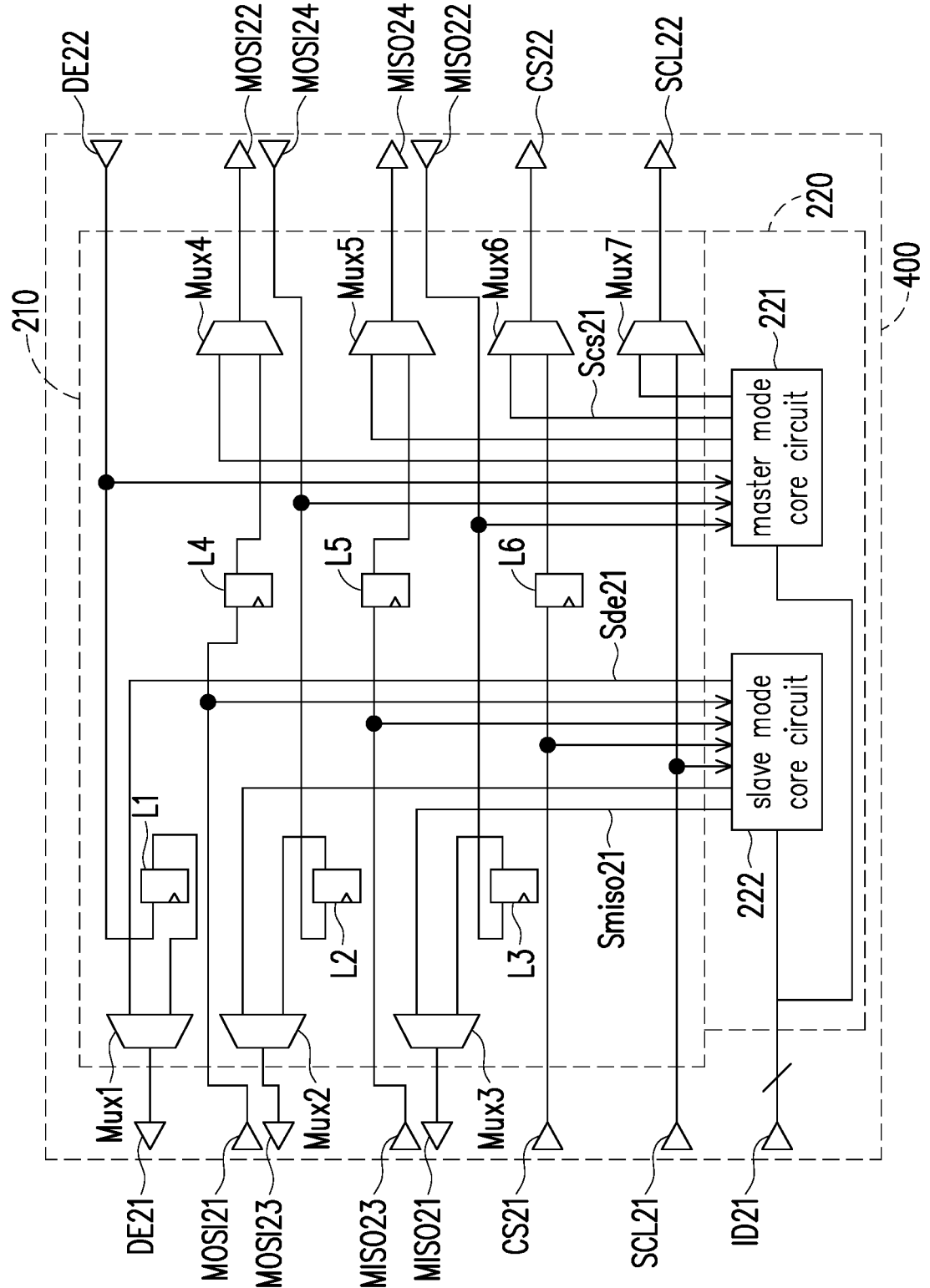
FIG. 4 is a schematic view of a circuit block of a daisy-chain SPI integrated circuit according to another embodiment of the disclosure.

FIG. 4 is a schematic view of a circuit block of a daisy-chain SPI integrated circuit 400 according to another embodiment of the disclosure. The daisy-chain SPI integrated circuit 400 shown in FIG. 4 includes the DE interface circuit DE21, the DE interface circuit DE22, the MOSI interface circuit MOSI21, the MOSI interface circuit MOSI22, an MOSI interface circuit MOSI23, an MOSI interface circuit MOSI24, the MISO interface circuit MISO21, the MISO interface circuit MISO22, an MISO interface circuit MISO23, an MISO interface circuit MISO24, the chip selection interface circuit CS21, the chip selection interface circuit CS22, the clock interface circuit SCL21, the clock interface circuit SCL22, the routing circuit 210, and the core circuit 220. The daisy-chain SPI integrated circuit 400, the DE interface circuit DE21, the DE interface circuit DE22, the MOSI interface circuit MOSI21, the MOSI interface circuit MOSI22, the MISO interface circuit MISO21, the MISO interface circuit MISO22, the chip selection interface circuit CS21, the chip selection interface circuit CS22, the clock interface circuit SCL21, the clock interface circuit SCL22, the routing circuit 210, and the core circuit 220 shown in FIG. 4 may be analogically reasoned by referring to the relevant description of the daisy-chain SPI IC 200, the DE interface circuit DE21, the DE interface circuit DE22, the MOSI interface circuit MOSI21, the MOSI interface circuit MOSI22, the MISO interface circuit MISO21, the MISO interface circuit MISO22, the chip selection interface circuit CS21, the chip selection interface circuit CS22, the clock interface circuit SCL21, the clock interface circuit SCL22, the routing circuit 210, and the core circuit 220 in FIG. 2A and FIG. 2B, which is not repeated herein. Based on the actual design, in some embodiments, the implementation details of the routing circuit 210 and the core circuit 220 shown in FIG. 2A and FIG. 2B may be analogically reasoned by referring to the relevant description of the routing circuit 210 and the core circuit 220 shown in FIG. 4.

In the embodiment shown in FIG. 4, the core circuit 220 includes a master mode core circuit 221 and a slave mode core circuit 222. The master mode core circuit 221 and the slave mode core circuit 222 are coupled to the routing circuit 210. Based on the exclusive identification code of the chip identification pin ID21, when the daisy-chain SPI integrated circuit 400 is used as the master IC M1, the master mode core circuit 221 may be enabled, and the slave mode core circuit 222 may be disabled. When the daisy-chain SPI integrated circuit 400 is used as one of the slave ICs S1-Sn, the master mode core circuit 221 may be disabled, and the slave mode core circuit 222 may be enabled.

In the embodiment shown in FIG. 4, the routing circuit 210 includes a latch circuit L1, a multiplexer Mux1, a latch circuit L3, and a multiplexer Mux3. The input terminal of the latch circuit L1 is coupled to the output terminal of the DE interface circuit DE22. The first input terminal of the multiplexer Mux1 is coupled to the slave mode core circuit 222 of the core circuit 220. The second input terminal of the multiplexer Mux1 is coupled to the output terminal of the latch circuit L1. The output terminal of the multiplexer Mux1 is coupled to the input terminal of the DE interface circuit DE21. When the daisy-chain SPI integrated circuit 400 is used as one of the slave ICs S1-Sn and when the daisy-chain SPI integrated circuit 400 is the target slave circuit selected by the master IC M1, the output terminal of the multiplexer Mux1 is selectively coupled to the first input terminal of the multiplexer Mux1, that is, the slave mode core circuit 222 is selectively coupled to the input terminal of the DE interface circuit DE21. When the daisy-chain SPI integrated circuit 400 is not the target slave circuit, the output terminal of the multiplexer Mux1 is selectively coupled to the second input terminal of the multiplexer Mux1, that is, the output terminal of the latch circuit L1 is selectively coupled to the input terminal of the DE interface circuit DE21.

The input terminal of the latch circuit L3 is coupled to the output terminal of the MISO interface circuit MISO22. The first input terminal of the multiplexer Mux3 is coupled to the slave mode core circuit 222 of the core circuit 220. The second input terminal of the multiplexer Mux3 is coupled to the output terminal of the latch circuit L3. The output terminal of the multiplexer Mux3 is coupled to the input terminal of the MISO interface circuit MISO21. When the daisy-chain SPI integrated circuit 400 is used as one of the slave ICs S1-Sn and when the daisy-chain SPI integrated circuit 400 is the target slave circuit selected by the master IC M1, the output terminal of the multiplexer Mux3 is selectively coupled to the first input terminal of the multiplexer Mux3, that is, the slave mode core circuit 222 is selectively coupled to the input terminal of the MISO interface circuit MISO21. When the daisy-chain SPI integrated circuit 400 is not the target slave circuit, the output terminal of the multiplexer Mux3 is selectively coupled to the second input terminal of the multiplexer Mux3, that is, the output terminal of the latch circuit L3 is selectively coupled to the input terminal of the MISO interface circuit MISO21.

In the embodiment shown in FIG. 4, the routing circuit 210 further includes a latch circuit L5 and a multiplexer Mux5. The input terminal of the latch circuit L5 is coupled to the output terminal of the MISO interface circuit MISO23. The first input terminal of the multiplexer Mux5 is coupled to the master mode core circuit 221 of the core circuit 220. The second input terminal of the multiplexer Mux5 is coupled to the output terminal of the latch circuit L5. The output terminal of the multiplexer Mux5 is coupled to the input terminal of the MISO interface circuit MISO24. When the daisy-chain SPI integrated circuit 400 is the master IC M1, the output terminal of the multiplexer Mux5 is selectively coupled to the first input terminal of the multiplexer Mux5, that is, the master mode core circuit 221 is selectively coupled to the input terminal of MISO interface circuit MISO24. When the daisy-chain SPI integrated circuit 400 is not the master IC M1, the output terminal of the multiplexer Mux5 is selectively coupled to the second input terminal of the multiplexer Mux5, that is, the output terminal of the latch circuit L5 is selectively coupled to the input terminal of the MISO interface circuit MISO24.

In the embodiment shown in FIG. 4, the routing circuit 210 further includes a latch circuit L4 and a multiplexer Mux4. The input terminal of the latch circuit L4 is coupled to the output terminal of the MOSI interface circuit MOSI21. The first input terminal of the multiplexer Mux4 is coupled to the master mode core circuit 221 of the core circuit 220. The second input terminal of the multiplexer Mux4 is coupled to the output terminal of the latch circuit L4. The output terminal of the multiplexer Mux4 is coupled to the input terminal of the MOSI interface circuit MOSI22. When the daisy-chain SPI integrated circuit 400 is the master IC M1 in the daisy-chain SPI architecture 100, the output terminal of the multiplexer Mux4 is selectively coupled to the first input terminal of the multiplexer Mux4, that is, the master mode core circuit 221 is selectively coupled to the input terminal of the MOSI interface circuit MOSI22. When the daisy-chain SPI integrated circuit 400 is not the master IC M1, the output terminal of the multiplexer Mux4 is selectively coupled to the second input terminal of the multiplexer Mux4, that is, the output terminal of the latch circuit L4 is selectively coupled to the input terminal of the MOSI interface circuit MOSI22.

In the embodiment shown in FIG. 4, the routing circuit 210 further includes a latch circuit L2 and a multiplexer Mux2. The input terminal of the latch circuit L2 is coupled to the output terminal of the MOSI interface circuit MOSI24. The first input terminal of the multiplexer Mux2 is coupled to the slave mode core circuit 222 of the core circuit 220. The second input terminal of the multiplexer Mux2 is coupled to the output terminal of the latch circuit L2. The output terminal of the multiplexer Mux2 is coupled to the input terminal of the MOSI interface circuit MOSI23. When the daisy-chain SPI integrated circuit 400 is used as one of the slave ICs S1-Sn and when the daisy-chain SPI integrated circuit 400 is the target slave circuit selected by the master IC M1, the output terminal of the multiplexer Mux2 is selectively coupled to the first input terminal of the multiplexer Mux2, that is, the slave mode core circuit 222 is selectively coupled to the input terminal of the MOSI interface circuit MOSI23. When the daisy-chain SPI integrated circuit 400 is not the target slave circuit, the output terminal of the multiplexer Mux2 is selectively coupled to the second input terminal of the multiplexer Mux2, that is, the output terminal of the latch circuit L2 is selectively coupled to the input terminal of the MOSI interface circuit MOSI23.

In the embodiment shown in FIG. 4, the routing circuit 210 further includes a latch circuit L6 and a multiplexer Mux6. The input terminal of the latch circuit L6 is coupled to the output terminal of the chip selection interface circuit CS21. The first input terminal of the multiplexer Mux6 is coupled to the master mode core circuit 221 of the core circuit 220. The second input terminal of the multiplexer Mux6 is coupled to the output terminal of the latch circuit L6. The output terminal of the multiplexer Mux6 is coupled to the input terminal of the chip selection interface circuit CS22. When the daisy-chain SPI integrated circuit 400 is the master IC M1, the output terminal of the multiplexer Mux6 is selectively coupled to the first input terminal of the multiplexer Mux6, that is, the master mode core circuit 221 is selectively coupled to the input terminal of the chip selection interface circuit CS22. When the daisy-chain SPI integrated circuit 400 is not the master IC M1, the output terminal of the multiplexer Mux6 is selectively coupled to the second input terminal of the multiplexer Mux6, that is, the output terminal of the latch circuit L6 is selectively coupled to the input terminal of the chip selection interface circuit CS22.

In the embodiment shown in FIG. 4, the routing circuit 210 further includes a multiplexer Mux7. The first input terminal of the multiplexer Mux7 is coupled to the master mode core circuit 221 of the core circuit 220. The second input terminal of the multiplexer Mux7 is coupled to the output terminal of the clock interface circuit SCL21. The output terminal of the multiplexer Mux7 is coupled to the input terminal of the clock interface circuit SCL22. When the daisy-chain SPI integrated circuit 400 is the master IC M1, the output terminal of the multiplexer Mux7 is selectively coupled to the first input terminal of the multiplexer Mux7, that is, the master mode core circuit 221 is selectively coupled to the input terminal of the clock interface circuit SCL22. When the daisy-chain SPI integrated circuit 400 is not the master IC M1, the output terminal of the multiplexer Mux7 is selectively coupled to the second input terminal of the multiplexer Mux7, and the output terminal of the clock interface circuit SCL21 is selectively coupled to the input terminal of the clock interface circuit SCL22.

When the daisy-chain SPI integrated circuit 400 is the master IC M1 of the daisy-chain SPI architecture 100, the master mode core circuit 221 may output the chip selection signal Scs21 to the slave ICs S1-Sn of the daisy-chain SPI architecture 100 through the multiplexer Mux6 of the routing circuit 210 and the chip selection interface circuit CS22, and the master mode core circuit 221 may read the target data of the target slave circuit corresponding to the chip selection signal Scs21 through the routing circuit 210 and the MISO interface circuit MISO22. When the daisy-chain SPI integrated circuit 400 is one of the slave ICs S1-Sn of the daisy-chain SPI architecture 100 and the daisy-chain SPI integrated circuit 400 is the target slave circuit selected by the master IC M1, the slave mode core circuit 222 may output the DE signal Sde21 to the master IC M1 of the daisy-chain SPI architecture 100 through the multiplexer Mux1 of the routing circuit 210 and the DE interface circuit DE21, and the slave mode core circuit 222 may send back the target data Smiso21 to the master IC M1 through the routing circuit and the first MISO interface circuit based on the timing of the DE signal Sde21.

The daisy-chain SPI integrated circuit 400 of the embodiment is applicable to the daisy-chain SPI architecture 100 shown in FIG. 1. In the daisy-chain SPI architecture 100, that is, in the multi-chip cascade architecture, the slave ICs S1-Sn are connected in series to form a daisy-chain, and the master IC M1 is connected to the first slave IC S1 in the daisy-chain. Based on the actual design, the daisy-chain SPI integrated circuit 400 may be used as the master IC M1 or one of the slave ICs S1-Sn. The daisy-chain SPI integrated circuit 400 may improve the multi-drop driving issue in a multi-chip system through the daisy-chain architecture. In addition, the slave ICs S1-Sn may be additionally given/defined one (or more) identical broadcast identification code ID_CM. The master IC M1 may use the broadcast identification code ID_CM to broadcast the shared data to the slave ICs S1-Sn. Through the broadcast operation, the transmission performance from the master IC M1 to the slave ICs S1-Sn may be effectively improved. Furthermore, the slave ICs S1-Sn may transmit the DE signal to the master IC M1. By adding a DE signal path by customizing the SPI protocol, with the daisy-chain SPI integrated circuit 400, the problem of the data sent back by different slave ICs in different time may be effectively solved.

According to different design requirements, the core circuit 220, the master mode core circuit 221, and/or the slave mode core circuit 222 may be implemented as a hardware, a firmware, a software (i.e., program), or a combination thereof. In terms of hardware, the core circuit 220, the master mode core circuit 221, and/or the slave mode core circuit 222 may be implemented in logic circuits on an integrated circuit. The related functions of the core circuit 220, the master mode core circuit 221, and/or the slave mode core circuit 222 may be implemented as a hardware by using hardware description languages (e.g., Verilog HDL or VHDL) or other suitable programming languages. For example, the related functions of the core circuit 220, the master mode core circuit 221, and/or the slave mode core circuit 222 may be implemented in one or more controllers, microcontrollers, microprocessors, application-specific integrated circuits (ASICs), digital signal processors (DSPs), field programmable gate arrays (FPGAs), and/or various logic blocks, modules, and circuits in other processing units.

In terms of software and/or firmware, the related functions of the core circuit 220, the master mode core circuit 221, and/or the slave mode core circuit 222 may be implemented as programming codes. For example, the core circuit 220, the master mode core circuit 221, and/or the slave mode core circuit 222 may be implemented by using general programming languages (e.g., C, C++, or assembly language) or other suitable programming languages. The programming code may be recorded/stored in a "non-transitory computer readable medium". In some embodiments, for example, the non-transitory computer readable medium includes read only memory (ROM), semiconductor memory, programmable logic circuits, and/or storage devices. The storage device includes a hard disk drive (HDD), a solid-state drive (SSD), or other storage devices. A central processing unit (CPU), a controller, a microcontroller, or a microprocessor may access and execute the programming code from the non-transitory computer readable medium, and thereby the related functions of the core circuit 220, the master mode core circuit 221, and/or the slave mode core circuit 222 are implemented.

Although the disclosure has been described with reference to the above embodiments, they are not intended to limit the disclosure. It will be apparent to one of ordinary skill in the art that modifications and changes to the described embodiments may be made without departing from the spirit and the scope of the disclosure. Accordingly, the scope of the disclosure will be defined by the attached claims and their equivalents and not by the above detailed descriptions.

What is claimed is:

1. A daisy-chain serial peripheral interface (SPI) integrated circuit (IC), comprising:
   a first master input/slave output (MISO) interface circuit;
   a second MISO interface circuit;
   a first data enable interface circuit;
   a second data enable interface circuit;
   a routing circuit coupled to an input terminal of the first MISO interface circuit, an output terminal of the second MISO interface circuit, an input terminal of the first data enable interface circuit, and an output terminal of the second data enable interface circuit; and
   a core circuit coupled to the routing circuit, wherein
   when the daisy-chain SPI IC is a slave IC of a daisy-chain SPI architecture, and the daisy-chain SPI IC is a target slave circuit selected by a master IC of the daisy-chain SPI architecture for reading target data, the core circuit outputs a data enable signal to the master IC through the routing circuit and the first data enable interface circuit, and the core circuit sends back the target data to the master IC through the routing circuit and the first MISO interface circuit based on a timing of the data enable signal; and
   when the daisy-chain SPI IC is the slave IC of the daisy-chain SPI architecture, and the daisy-chain SPI IC is not the target slave circuit, the routing circuit transmits a signal received by the second data enable interface circuit to the first data enable interface circuit, and the routing circuit transmits data received by the second MISO interface circuit to the first MISO interface circuit.

2. The daisy-chain SPI IC according to claim 1, wherein the routing circuit comprises:
   a first latch circuit comprising an input terminal coupled to the output terminal of the second data enable interface circuit;
   a first multiplexer comprising a first input terminal coupled to the core circuit, wherein a second input terminal of the first multiplexer is coupled to an output terminal of the first latch circuit, an output terminal of the first multiplexer is coupled to the input terminal of the first data enable interface circuit, the output terminal of the first multiplexer is selectively coupled to the first input terminal of the first multiplexer when the daisy-chain SPI IC is the target slave circuit, and the output terminal of the first multiplexer is selectively coupled to the second input terminal of the first multiplexer when the daisy-chain SPI IC is not the target slave circuit;
a second latch circuit comprising an input terminal coupled to the output terminal of the second MISO interface circuit; and
a second multiplexer comprising a first input terminal coupled to the core circuit, wherein a second input terminal of the second multiplexer is coupled to an output terminal of the second latch circuit, an output terminal of the second multiplexer is coupled to the input terminal of the first MISO interface circuit, the output terminal of the second multiplexer is selectively coupled to the first input terminal of the second multiplexer when the daisy-chain SPI IC is the target slave circuit, and the output terminal of the second multiplexer is selectively coupled to the second input terminal of the second multiplexer when the daisy-chain SPI IC is not the target slave circuit.

3. The daisy-chain SPI IC according to claim 2, wherein the daisy-chain SPI IC further comprises a third MISO interface circuit and a fourth MISO interface circuit, and the routing circuit further comprises:
a third latch circuit comprising an input terminal coupled to an output terminal of the third MISO interface circuit; and
a third multiplexer comprising a first input terminal coupled to the core circuit, wherein a second input terminal of the third multiplexer is coupled to an output terminal of the third latch circuit, an output terminal of the third multiplexer is coupled to an input terminal of the fourth MISO interface circuit, the output terminal of the third multiplexer is selectively coupled to the first input terminal of the third multiplexer when the daisy-chain SPI IC is the master IC, and the output terminal of the third multiplexer is selectively coupled to the second input terminal of the third multiplexer when the daisy-chain SPI IC is not the master IC.

4. The daisy-chain SPI IC according to claim 1, further comprising:
a first master output/slave input (MOSI) interface circuit; and
a second MOSI interface circuit, wherein the routing circuit is also coupled to an output terminal of the first MOSI interface circuit and an input terminal of the second MOSI interface circuit,
when the daisy-chain SPI IC is the slave IC of the daisy-chain SPI architecture, the routing circuit transmits master circuit data received by the first MOSI interface circuit to the second MOSI interface circuit and the core circuit; and
when the daisy-chain SPI IC is the master IC of the daisy-chain SPI architecture, the core circuit outputs the master circuit data to a plurality of slave ICs of the daisy-chain SPI architecture through the routing circuit and the second MOSI interface circuit.

5. The daisy-chain SPI IC according to claim 4, wherein the routing circuit comprises:
a first latch circuit comprising an input terminal coupled to the output terminal of the first MOSI interface circuit; and
a first multiplexer comprising a first input terminal coupled to the core circuit, wherein a second input terminal of the first multiplexer is coupled to an output terminal of the first latch circuit, an output terminal of the first multiplexer is coupled to the input terminal of the second MOSI interface circuit, the output terminal of the first multiplexer is selectively coupled to the first input terminal of the first multiplexer when the daisy-chain SPI IC is the master IC, and the output terminal of the first multiplexer is selectively coupled to the second input terminal of the first multiplexer when the daisy-chain SPI IC is not the master IC.

6. The daisy-chain SPI IC according to claim 5, wherein the daisy-chain SPI IC further comprises a third MOSI interface circuit and a fourth MOSI interface circuit, and the routing circuit further comprises:
a second latch circuit comprising an input terminal coupled to an output terminal of the fourth MOSI interface circuit; and
a second multiplexer comprising a first input terminal coupled to the core circuit, wherein a second input terminal of the second multiplexer is coupled to an output terminal of the second latch circuit, an output terminal of the second multiplexer is coupled to an input terminal of the third MOSI interface circuit, the output terminal of the second multiplexer is selectively coupled to the first input terminal of the second multiplexer when the daisy-chain SPI IC is the target slave circuit, and the output terminal of the second multiplexer is selectively coupled to the second input terminal of the second multiplexer when the daisy-chain SPI IC is not the target slave circuit.

7. The daisy-chain SPI IC according to claim 1, further comprising:
a first chip selection interface circuit; and
a second chip selection interface circuit, wherein the routing circuit is also coupled to an output terminal of the first chip selection interface circuit and an input terminal of the second chip selection interface circuit,
when the daisy-chain SPI IC is the slave IC of the daisy-chain SPI architecture, the routing circuit transmits a chip selection signal received by the first chip selection interface circuit to the second chip selection interface circuit and the core circuit, and the core circuit decodes the chip selection signal to determine whether the daisy-chain SPI IC is the target slave circuit selected by the master IC; and
when the daisy-chain SPI IC is the master IC of the daisy-chain SPI architecture, the core circuit outputs the chip selection signal to a plurality of slave ICs of the daisy-chain SPI architecture through the routing circuit and the second chip selection interface circuit, and the core circuit reads the target data of the target slave circuit corresponding to the chip selection signal through the routing circuit and the second MISO interface circuit.

8. The daisy-chain SPI IC according to claim 7, wherein when a decoding result of the core circuit decoding the chip selection signal matches an exclusive identification code of the daisy-chain SPI IC, the core circuit determines that the daisy-chain SPI IC is the target slave circuit selected by the master IC;
when the decoding result does not match the exclusive identification code of the daisy-chain SPI IC but matches a broadcast identification code shared by the slave ICs of the daisy-chain SPI architecture, the core circuit determines that the daisy-chain SPI IC is the target slave circuit selected by the master IC; and
when the decoding result matches neither the exclusive identification code of the daisy-chain SPI IC nor the broadcast identification code, the core circuit determines that the daisy-chain SPI IC is not the target slave circuit selected by the master IC.

9. The daisy-chain SPI IC according to claim 7, wherein the routing circuit comprises:
   a latch circuit comprising an input terminal coupled to the output terminal of the first chip selection interface circuit; and
   a multiplexer comprising a first input terminal coupled to the core circuit, wherein a second input terminal of the multiplexer is coupled to an output terminal of the latch circuit, an output terminal of the multiplexer is coupled to the input terminal of the second chip selection interface circuit, the output terminal of the multiplexer is selectively coupled to the first input terminal of the multiplexer when the daisy-chain SPI IC is the master IC, and the output terminal of the multiplexer is selectively coupled to the second input terminal of the multiplexer when the daisy-chain SPI IC is not the master IC.

10. The daisy-chain SPI IC according to claim 7, wherein the core circuit comprises:
   a master mode core circuit coupled to the routing circuit, wherein when the daisy- chain SPI IC is the master IC of the daisy-chain SPI architecture, the master mode core circuit outputs the chip selection signal to the slave ICs of the daisy-chain SPI architecture through the routing circuit and the second chip selection interface circuit, and the master mode core circuit reads the target data of the target slave circuit corresponding to the chip selection signal through the routing circuit and the second MISO interface circuit; and
   a slave mode core circuit coupled to the routing circuit, wherein when the daisy-chain SPI IC is the slave IC of the daisy-chain SPI architecture, and the daisy-chain SPI IC is the target servant circuit, the slave mode core circuit outputs the data enable signal to the master IC of the daisy-chain SPI architecture through the routing circuit and the first data enable interface circuit, and the slave mode core circuit sends back the target data to the master IC through the routing circuit and the first MISO interface circuit based on the timing of the data enable signal.

11. The daisy-chain SPI IC according to claim 1, further comprising:
   a first clock interface circuit; and
   a second clock interface circuit, wherein the routing circuit is also coupled to an output terminal of the first clock interface circuit and an input terminal of the second clock interface circuit,
   when the daisy-chain SPI IC is the slave IC of the daisy-chain SPI architecture, the routing circuit transmits a clock signal received by the first clock interface circuit to the second clock interface circuit and the core circuit; and
   when the daisy-chain SPI IC is the master IC of the daisy-chain SPI architecture, the core circuit outputs the clock signal to a plurality of slave ICs of the daisy-chain SPI architecture through the routing circuit and the second clock interface circuit.

12. The daisy-chain SPI IC according to claim 11, wherein the routing circuit comprises:
   a multiplexer comprising a first input terminal coupled to the core circuit, wherein a second input terminal of the multiplexer is coupled to the output terminal of the first clock interface circuit, an output terminal of the multiplexer is coupled to the input terminal of the second clock interface circuit, the output terminal of the multiplexer is selectively coupled to the first input terminal of the multiplexer when the daisy-chain SPI IC is the master IC, and the output terminal of the multiplexer is selectively coupled to the second input terminal of the multiplexer when the daisy-chain SPI IC is not the master IC.

13. An operation method of a daisy-chain serial peripheral interface (SPI) integrated circuit (IC), comprising:
   defining an exclusive identification code of the daisy-chain SPI IC by at least one chip identification pin of the daisy-chain SPI IC;
   determining whether the daisy-chain SPI IC is a target slave circuit selected by a master IC of a daisy-chain SPI architecture by a core circuit of the daisy-chain SPI IC when the exclusive identification code indicates that the daisy-chain SPI IC is a slave IC of the daisy-chain SPI architecture;
   outputting a data enable signal to the master IC by the core circuit through a routing circuit of the daisy-chain SPI IC and a first data enable interface circuit of the daisy-chain SPI IC when the daisy-chain SPI IC is the slave IC of the daisy-chain SPI architecture and the daisy-chain SPI IC is the target slave circuit selected by the master IC for reading target data, and sending back the target data to the master IC by the core circuit through the routing circuit and a first master input/slave output (MISO) interface circuit of the daisy-chain SPI IC based on a timing of the data enable signal; and
   transmitting a signal received by a second data enable interface circuit of the daisy-chain SPI IC to the first data enable interface circuit by the routing circuit, and transmitting data received by a second MISO interface circuit of the daisy-chain SPI IC to the first MISO interface circuit by the routing circuit when the daisy-chain SPI IC is the slave IC of the daisy-chain SPI architecture and the daisy-chain SPI IC is not the target slave circuit.

14. The operation method according to claim 13, wherein the routing circuit comprises a first latch circuit, a second latch circuit, a first multiplexer, and a second multiplexer, an input terminal of the first latch circuit is coupled to the second data enable interface circuit, a first input terminal of the first multiplexer is coupled to the core circuit, a second input terminal of the first multiplexer is coupled to an output terminal of the first latch circuit, an output terminal of the first multiplexer is coupled to the first data enable interface circuit, an input terminal of the second latch circuit is coupled to the second MISO interface circuit, a first input terminal of the second multiplexer is coupled to the core circuit, a second input terminal of the second multiplexer is coupled to an output terminal of the second latch circuit, an output terminal of the second multiplexer is coupled to the first MISO interface circuit, and the operation method further comprises:
   when the daisy-chain SPI IC is the target slave circuit, selectively coupling the output terminal of the first multiplexer to the first input terminal of the first multiplexer, and selectively coupling the output terminal of the second multiplexer to the first input terminal of the second multiplexer; and
   when the daisy-chain SPI IC is not the target slave circuit, selectively coupling the output terminal of the first multiplexer to the second input terminal of the first multiplexer, and selectively coupling the output terminal of the second multiplexer to the second input terminal of the second multiplexer.

15. The operation method according to claim 14, wherein the daisy-chain SPI IC further comprises a third MISO interface circuit and a fourth MISO interface circuit, the routing circuit further comprises a third latch circuit and a third multiplexer, an input terminal of the third latch circuit is coupled to an output terminal of the third MISO interface circuit, a first input terminal of the third multiplexer is coupled to the core circuit, a second input terminal of the third multiplexer is coupled to an output terminal of the third latch circuit, an output terminal of the third multiplexer is coupled to an input terminal of the fourth MISO interface circuit, and the operation method further comprises:
  when the daisy-chain SPI IC is the master IC, selectively coupling the output terminal of the third multiplexer to the first input terminal of the third multiplexer; and
  when the daisy-chain SPI IC is not the master IC, selectively coupling the output terminal of the third multiplexer to the second input terminal of the third multiplexer.

16. The operation method according to claim 13, wherein the daisy-chain SPI IC further comprises a first master output/slave input (MOSI) interface circuit and a second MOSI interface circuit, the routing circuit is also coupled to an output terminal of the first MOSI interface circuit and an input terminal of the second MOSI interface circuit, and the operation method further comprises:
  when the daisy-chain SPI IC is the slave IC of the daisy-chain SPI architecture, transmitting master circuit data received by the first MOSI interface circuit to the second MOSI interface circuit and the core circuit by the routing circuit; and
  when the daisy-chain SPI IC is the master IC of the daisy-chain SPI architecture, outputting the master circuit data to a plurality of slave ICs of the daisy-chain SPI architecture by the core circuit through the routing circuit and the second MOSI interface circuit.

17. The operation method according to claim 16, wherein the routing circuit comprises a first latch circuit and a first multiplexer, an input terminal of the first latch circuit is coupled to the output terminal of the first MOSI interface circuit, a first input terminal of the first multiplexer is coupled to the core circuit, a second input terminal of the first multiplexer is coupled to an output terminal of the first latch circuit, an output terminal of the first multiplexer is coupled to the input terminal of the second MOSI interface circuit, and the operation method further comprises:
  when the daisy-chain SPI IC is the master IC, selectively coupling the output terminal of the first multiplexer to the first input terminal of the first multiplexer; and
  when the daisy-chain SPI IC is not the master IC, selectively coupling the output terminal of the first multiplexer to the second input terminal of the first multiplexer.

18. The operation method according to claim 17, wherein the daisy-chain SPI IC further comprises a third MOSI interface circuit and a fourth MOSI interface circuit, the routing circuit further comprises a second latch circuit and a second multiplexer, an input terminal of the second latch circuit is coupled to an output terminal of the fourth MOSI interface circuit, a first input terminal of the second multiplexer is coupled to the core circuit, a second input terminal of the second multiplexer is coupled to an output terminal of the second latch circuit, an output terminal of the second multiplexer is coupled to an input terminal of the third MOSI interface circuit, and the operation method further comprises:
  when the daisy-chain SPI IC is the target slave circuit, selectively coupling the output terminal of the second multiplexer to the first input terminal of the second multiplexer; and
  when the daisy-chain SPI IC is not the target slave circuit, selectively coupling the output terminal of the second multiplexer to the second input terminal of the second multiplexer.

19. The operation method according to claim 13, wherein the daisy-chain SPI IC further comprises a first chip selection interface circuit and a second chip selection interface circuit, the routing circuit is also coupled to an output terminal of the first chip selection interface circuit and an input terminal of the second chip selection interface circuit, and the operation method further comprises:
  when the daisy-chain SPI IC is the slave IC of the daisy-chain SPI architecture, transmitting a chip selection signal received by the first chip selection interface circuit to the second chip selection interface circuit and the core circuit by the routing circuit, and determining whether the daisy-chain SPI IC is the target slave circuit selected by the master IC by the core circuit decoding the chip selection signal; and
  when the daisy-chain SPI IC is the master IC of the daisy-chain SPI architecture, outputting the chip selection signal by the core circuit through the routing circuit and the second chip selection interface circuit to a plurality of slave ICs of the daisy-chain SPI architecture, and reading the target data of the target slave circuit corresponding to the chip selection signal by the core circuit through the routing circuit and the second MISO interface circuit.

20. The operation method according to claim 19, further comprising:
  when a decoding result of the core circuit decoding the chip selection signal matches an exclusive identification code of the daisy-chain SPI IC, determining that the daisy-chain SPI IC is the target slave circuit selected by the master IC;
  when the decoding result does not match the exclusive identification code of the daisy-chain SPI IC but matches a broadcast identification code shared by the slave ICs of the daisy-chain SPI architecture, determining that the daisy-chain SPI IC is the target slave circuit selected by the master IC; and
  when the decoding result matches neither the exclusive identification code of the daisy-chain SPI IC nor the broadcast identification code, determining that the daisy-chain SPI IC is not the target slave circuit selected by the master IC.

21. The operation method according to claim 19, wherein the routing circuit comprises a latch circuit and a multiplexer, an input terminal of the latch circuit is coupled to the output terminal of the first chip selection interface circuit, a first input terminal of the multiplexer is coupled to the core circuit, a second input terminal of the multiplexer is coupled to an output terminal of the latch circuit, an output terminal of the multiplexer is coupled to the input terminal of the second chip selection interface circuit, and the operation method further comprises:
  when the daisy-chain SPI IC is the master IC, selectively coupling the output terminal of the multiplexer to the first input terminal of the multiplexer; and
  when the daisy-chain SPI IC is not the master IC, coupling the output terminal of the multiplexer to the second input terminal of the multiplexer.

22. The operation method according to claim 19, wherein the core circuit comprises a master mode core circuit and a slave mode core circuit, the master mode core circuit and the slave mode core circuit are coupled to the routing circuit, and the operation method further comprises:

when the daisy-chain SPI IC is the master IC of the daisy-chain SPI architecture, outputting the chip selection signal to the slave ICs of the daisy-chain SPI architecture by the master mode core circuit through the routing circuit and the second chip selection interface circuit, and reading the target data of the target slave circuit corresponding to the chip selection signal by the master mode core circuit through the routing circuit and the second MISO interface circuit; and when the daisy-chain SPI IC is the slave IC of the daisy-chain SPI architecture and the daisy-chain SPI IC is the target slave circuit, outputting the data enable signal to the master IC of the daisy-chain SPI architecture by the slave mode core circuit through the routing circuit and the first data enable interface circuit, and sending back the target data to the master IC by the slave mode core circuit through the routing circuit and the first MISO interface circuit based on the timing of the data enable signal.

23. The operation method according to claim 13, wherein the daisy-chain SPI IC further comprises a first clock interface circuit and a second clock interface circuit, the routing circuit is also coupled to an output terminal of the first clock interface circuit and an input terminal of the second clock interface circuit, and the operation method further comprises:

when the daisy-chain SPI IC is the slave IC of the daisy-chain SPI architecture, transmitting a clock signal received by the first clock interface circuit to the second clock interface circuit and the core circuit by the routing circuit; and when the daisy-chain SPI IC is the master IC of the daisy-chain SPI architecture, outputting the clock signal to a plurality of slave ICs of the daisy-chain SPI architecture by the core circuit through the routing circuit and the second clock interface circuit.

24. The operation method according to claim 23, wherein the routing circuit comprises a multiplexer, a first input terminal of the multiplexer is coupled to the core circuit, a second input terminal of the multiplexer is coupled to the output terminal of the first clock interface circuit, an output terminal of the multiplexer is coupled to the input terminal of the second clock interface circuit, and the operation method further comprises:

when the daisy-chain SPI IC is the master IC, selectively coupling the output terminal of the multiplexer to the first input terminal of the multiplexer; and when the daisy-chain SPI IC is not the master IC, selectively coupling the output terminal of the multiplexer to the second input terminal of the multiplexer.

* * * * *